(No Model.)
W. CLOUGH.
COMBINATION TOOL.
No. 595,524. Patented Dec. 14, 1897.
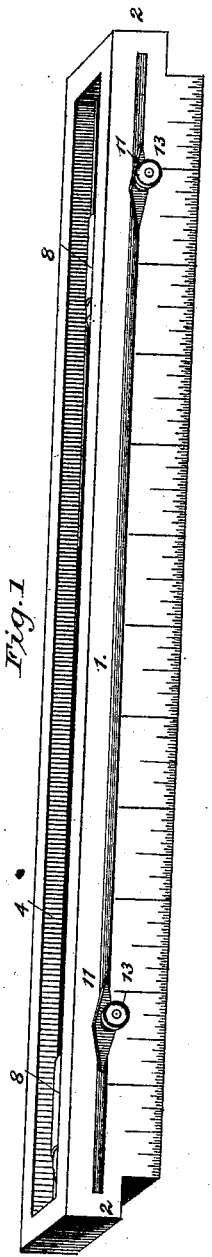
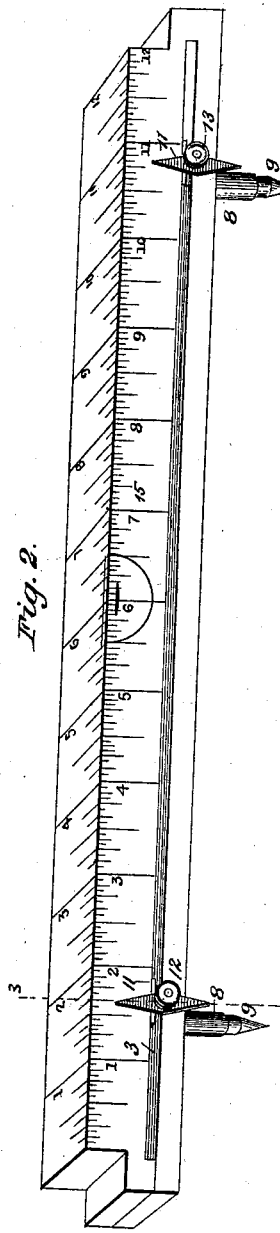
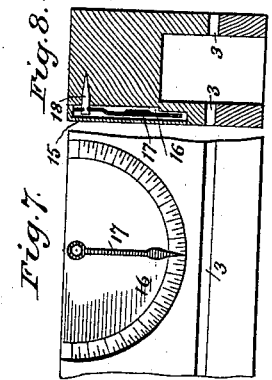
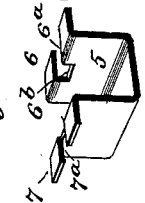
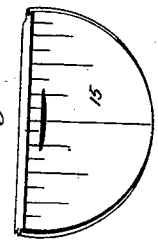
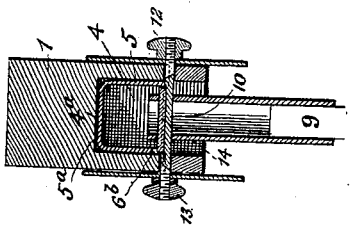
WITNESSES:
INVENTOR
WILLIAM CLOUGH
BY
Fred G. Dieterich & Co.
ATTORNEYS

UNITED STATES PATENT OFFICE.

WILLIAM CLOUGH, OF ROCKLAND, DELAWARE.

COMBINATION-TOOL.

SPECIFICATION forming part of Letters Patent No. 595,524, dated December 14, 1897.

Application filed April 14, 1897. Serial No. 632,174. (No model.)

*To all whom it may concern:*

Be it known that I, WILLIAM CLOUGH, residing at Rockland, in the county of New Castle and State of Delaware, have invented a new and Improved Combination-Tool, of which the following is a specification.

My invention is in the nature of a combined foot-rule, circle, and curve-marker, and a level and grade gage, and it seeks to provide an implement of this character of a very simple and economical construction which can be easily manipulated and which will effectively serve for its intended purposes.

My invention also has for its object to provide a combination-tool the component parts of which are so arranged and combined that when properly adjusted the same will accurately serve for each individual purpose for which it may be used.

With other objects in view which will hereinafter be referred to the invention consists in such peculiar combination and novel arrangement of parts as will be first described in detail and then specifically pointed out in the accompanying drawings, in which—

Figure 1 is a perspective view of my improvement, illustrating the several parts so adjusted as to produce a foot-rule, the body being shown inverted. Fig. 2 is a similar view, the same being adjusted to serve as a circle-marker. Fig. 3 is a cross-section on an enlarged scale, taken on the line 3 3 of Fig. 2. Fig. 4 is a detail view of one of the pencil-holders detached. Fig. 5 is a detail view of one of the bonnets or pencil-holder slide members hereinafter referred to. Fig. 6 is a view of the removable lip or slide plate. Fig. 7 is a face view of the grade-gager portion of the rule, and Fig. 8 is a transverse section thereof.

In its practical construction my invention embodies a rule-body 1, formed preferably of boxwood of suitable thickness, preferably five-eighths of an inch by one inch deep to bottom. The body 1 is twelve inches long at the upper part for three-eighths of its depth, the lower projecting one-half inch at each end to form extensions 2 2 for a purpose presently explained. At the bottom the body has an internal groove 4 the depth of three-fourths of an inch for twelve and one-half inches of its length and has grooves 3 in the sides one-fourth of an inch from the bottom edge, which extend the same length as the internal groove 4. Within the groove 4 are held to slide a pair of bonnets 5, one of which is shown in detail in Fig. 5, by reference to which it will be seen that the same consists of a ⌴-shaped body of a depth to slide freely on the groove 4, with its bottom 5ª bearing against the bottom 4ª of such groove 4, its outer ends being bent at right angles, as at 6 7, to fit and slide freely in the side grooves 3 3. Each of the ends has a central cut-out portion 6ª 7ª, and one of such ends has a recess 6ᵇ of one-eighth of an inch depth in its vertical portion.

8 indicates the pencil-holders, one for each bonnet, which is of a suitable length and of a width to receive a pencil portion 9. The upper end of the holder has a non-circular opening 9ª.

10 indicates the pivot-bolts for the pencil-holders 8 and the indicators 11, a pair of which is used with each bolt, one at each end. The bolts 10, as will be seen from Fig. 3, are of a suitable length to project through the body 1 and extend at each end to receive the indicators 11 and thumb-nuts 12 13, the said extended ends being threaded to receive the nuts. The bolts 10 have a keyway three-fourths of an inch long to receive a key or feather 14.

In adjusting the several parts for use the bolts are run through the cavities or cut-out portions 6ª 7ª of the bonnets and rest between the same, they being also passed through the apertures in the inner ends of the pencil-holders. After the bolts are thus inserted the feather or key is inserted through the cut-out portion 6ᵇ of the bonnet provided for such purpose, then through the non-circular apertures in the pencil-holders to a point against the other side of the bonnet, but not through it, such construction being provided to lock the pencil-holders to the bolts and for seating the bolts in the cut-out portions 6ª 7ª of the bonnets, so that when the bolts are turned the holders will be turned out to a marking position.

The indicators are fitted on the ends of the bolts to turn therewith, and at one side the thumb-nut is made fast to the bolt, as it is used exclusively for turning out and in the holder, while the other nut serves as a tightener-nut to hold the marker to any of its adjusted positions.

In the center of the rule, on one side, is a lip or slide piece 15, which is cut out of the body and made to slide in grooves to form a continuation of the front face of the rule when in position, as shown in Fig. 1, such lip being of a semicircular shape, as shown. The body 1 under the slide lip or plate has a center sunk portion 16, which has semicircular gage or scale dial, over which is held to swing freely on a stud-pin 18 a pointer 17, as clearly shown.

While the body 1 may be made of a single member, I prefer to construct it of two sections, as shown in Fig. 2, so as to facilitate the adjustment of the several parts, especially as relates to the pencil-holders, the bolts, and the feather devices therefor.

I also desire it understood that while I prefer to construct the implement of the sizes described in regard to the thickness, depth of grooves, &c., these may be varied in accordance with the different sizes of which the implement may be made.

From the foregoing description, taken in connection with the accompanying drawings, it is thought the complete advantages of my invention will be readily understood.

One or more sides may be gaged, and when three sides are gaged, as shown, the one side is gaged to the one thirty-second part of an inch, the other side one-sixteenth of an inch, and the top one-eighth of an inch, thereby producing, as it were, three distinct rule-faces. The same can be used simply as a foot-rule, as a level, as a grade-indicator, or as a circle or curve marker, and, if desired, the several parts may be used in combination.

The value of this invention will be readily apparent to architects, machinists, landscape or ornamental painters, carpenters, &c., or any person engaged in almost any conceivable trade, to all of whom it will be found a great boon in the shape of economy, accuracy, and utility.

Having thus described my invention, what I claim, and desire to secure by Letters Patent, is—

1. An instrument, comprising a body portion, having one or more of its faces ruled and having a longitudinal socket in one face, and crayon or point holders held to slide in such socket and pivotally connected in such a manner as to fold completely within such socket when not in use, as specified.

2. An instrument as described, comprising a body member having one or more of its faces ruled, a longitudinal socket in its bottom, having guide-slots in its sides communicating with socket bonnets or slides fitting the sockets and crayon or point holders pivotally connected and longitudinally movable within the socket therewith, as specified.

3. In an instrument as described, the combination with the body having one or more of its outer faces ruled, and having its bottom formed with a longitudinal socket, and having guide-slots in the sides thereof communicating with the socket, of a bonnet or guide longitudinally movable in the socket, having a base portion adapted to the upper part of the socket, and lateral flanges 6 7 fitting in the guide-slots, said flanges having cut-out portions adapted to form seats for a transverse pivot-bolt, one of such cut-out portions extending upward as at $7^b$, a pivot-bolt extending through the guide-slots and fitting the seats of the flanges 6 7, said bolt having a keyway, a feather 14 held therein, the ends of the bolts having threads, the thumb-nuts and indicators held thereon, and the pencil-holders, said holders having non-circular apertures to receive the bolt and key, all being arranged substantially as shown and described.

4. A combination instrument comprising a body member formed in sections, having one or more of its faces ruled, and having a longitudinal socket in its bottom, a pair of crayon or point holders pivotally held within the socket and longitudinally adjustable therein, said body having one face countersunk centrally, and provided with a segmental scale, and a gravity-pointer, and a slide or lip plate detachably held over such countersunk portion having its outer face ruled, all being arranged substantially as shown and for the purposes described.

WILLIAM CLOUGH.

Witnesses:
 DANIEL J. MONIGLE,
 ALEXANDER C. HARRIS.